May 19, 1953 — E. GURIN ET AL — 2,639,249
LINER FOR RUBBER SHEETING
Filed April 26, 1949
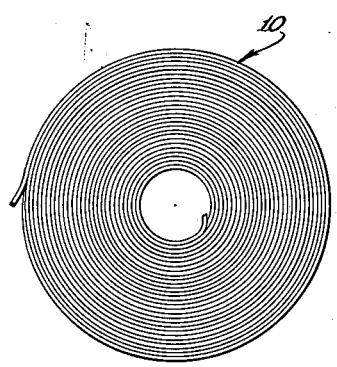
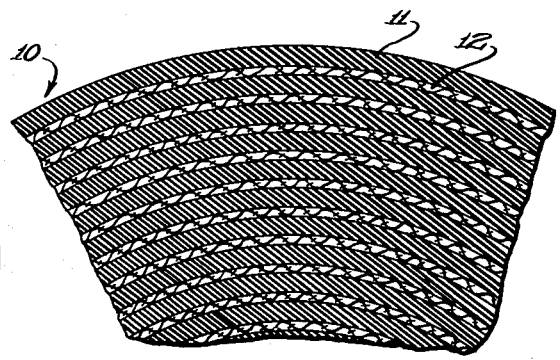
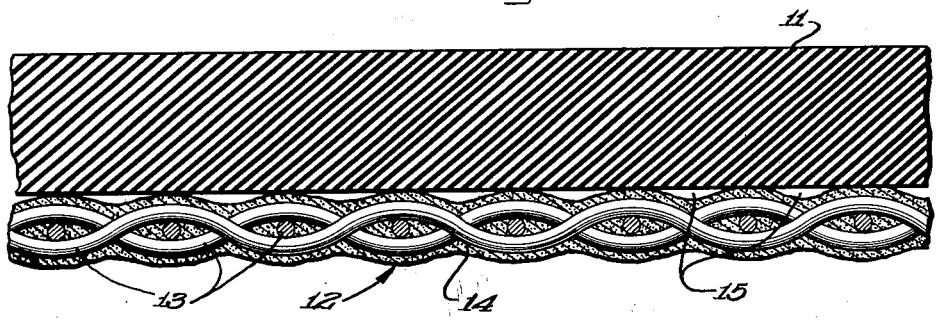
Inventors
Emanuel Gurin
Karl Fox
Attys Patented May 19, 1953

2,639,249

UNITED STATES PATENT OFFICE 2,639,249

LINER FOR RUBBER SHEETING

Emanuel Gurin and Karl Fox, Chicago, Ill., assignors to Rapid Roller Company, Chicago, Ill., a corporation of Illinois Application April 26, 1949, Serial No. 89,672

1 Claim. (Cl. 154—46)

The present invention relates to a liner for rubber material, and to a process for making the same.

In particular, the invention relates to a coated fabric composition which may be inserted between sheets of rubber material, either natural or synthetic, to serve as a very effective backing member so that the rubber sheet may be stored indefinitely and may be easily stripped from the backing member without the rubber sticking unduly thereto.

It has been found that when rubber sheets are coiled for purposes of storage with rubber surfaces being separated by an ordinary fabric, or commercially treated liner, it is difficult if not impossible to strip the rubber sheet material from the backing cloth member without injury to the rubber sheet. This is especially true in the case of synthetic rubbers which contain ester and other types of plasticizers. This effect may be due to the migration of the plasticizer from the rubber into the liner material, or the affecting of the rubber sheeting by materials in the liner coating or a purely physical attraction of liner and rubber sheeting.

An object of the present invention is to provide a liner adapted to be inserted between sheets of rubber material to permit superimposing such rubber sheets without the rubber material sticking unduly to the surface of the liner.

A further object of the present invention is to provide a liner material which may be used as backing surface for sheets of synthetic rubber containing ester type plasticizers capable of resisting the migration of the plasticizer from the rubber material to the liner.

Another object of the present invention is to provide a method for the production of a coated woven fabric suitable for use as a liner for rubber sheets.

In accordance with the present invention, a woven fabric, such as duck, is treated with a fluid coating composition containing as essential ingredients, polyvinyl butyral and an acetal forming compound, such as an aldehyde or an aldehyde forming compound, for example, formaldehyde, glyoxal, furfural, paraformaldehyde, and the like. An especially preferred aldehyde forming compound is hexamethylenetetramine. These compounds undergo a reaction under the influence of heat and set to a non-tacky but pliable coating on the surfaces of the fabric. The nature of the reaction is not completely understood, but it is believed that the aldehyde group reacts with free hydroxyl groups present in the polyvinyl butyral which contains free hydroxyl groups. In the preparation of polyvinyl butyral, a polyvinyl alcohol is reacted with butyraldehyde under the influence of heat and a catalyst causing the production of interlinked C—O—C groups with the splitting off of water molecules. All hydroxy groups are not completely reacted in this synthesis, and the added aldehyde group is capable of reacting with the free hydroxy groups to form interlinked acetals. This product is cured to a firm, non-tacky coating on the surface of the woven fabric which has been found to be an excellent backing surface for sheets of rubber or rubber-like material.

While the coating of the woven fabric may be accomplished by merely mixing the polyvinyl butyral with the hexamethylenetetramine in a mutual solvent, such as an alcohol or a combination of alcohol and an aromatic solvent, together with a plasticizer, and the fluid mixture applied to the surface of the fabric, we prefer to incorporate with the two named ingredients other agents which make the coating more water solvent, and plasticizer resistant and more pliable. One such preferred additive is a phenol-formaldehyde condensation product soluble in alcohol and acetone. This stage of reaction product is known generally as a resol or "Type A" phenol-formaldehyde resin. In addition, we prefer to add an ester type plasticizer of the type commonly used in connection with synthetic rubbers. Typical among these plasticizers are phosphates such as triethyl phosphate, tributyl phosphate, cresyl diphenyl phosphate, and tricresyl phosphate and the phthalates such as dimethyl phthalate, diethyl phthalate, dibutyl phthalate, diamyl phthalate, and dihexyl phthalate. In addition, various other ester type plasticizers, such as for example, methyl abietate, triethyl citrate, tributyl citrate, butyl ricinoleate, dimethyl sebacate, dibutyl sebacate, butyl laurate, amyl laurate, castor oil, and butyl oleate, may be used.

The preferred solvents to be used in compounding the coating are alcohols such as methyl alcohol, ethyl alcohol, isopropyl alcohol, butyl alcohol, and isobutyl alcohol, and the aromatic hydrocarbons such as toluene and xylene. Preferably, the solvent is a mixture of both types of the solvents listed above.

In general, the coating composition has the following analysis:

100 parts by weight of polyvinyl butyral
0 to 200 parts by weight of an alcohol-soluble phenol-formaldehyde resin 5 to 25 parts by weight of hexamethylenetetramine 5 to 100 parts by weight of an ester type plasticizer One specific composition which may be used in accordance with the present invention is the following:

100 parts by weight of polyvinyl butyral
25 parts by weight of hexamethylenetetramine
10 parts by weight of dibutyl phthalate An especially preferred formula is the following:

100 parts by weight of polyvinyl butyral
20 parts of an alcohol-soluble phenol-formaldehyde resin
5 parts by weight of hexamethylenetetramine
10 parts by weight of dibutyl phthalate
200 parts by weight of ethyl alcohol
200 parts by weight of toluene The coating is applied to one or both surfaces of the woven fabric in an amount such that the coating constitutes from about 20 to 200% by weight of the finally coated fabric. The coated fabric is next dried at a moderate temperature sufficient to volatilize the solvents present. Normally, this temperature will be less than about 200° F. After volatilization of the solvent, the coated fabric is next subjected to rather elevated temperatures, normally on the order of 300 to 350° F. for the purpose of setting and curing the composition to a non-tacky layer or film firmly bonded to the surfaces of the fabric.

The present invention will further be described in connection with the description of the attached sheet of drawings, in which:

Figure 1 is an end view of a laminated structure comprising a sheet of rubber material and a treated liner rolled together into the form of a coil;

Figure 2 is an enlarged fragmentary view of a section of the coil shown in Figure 1; and Figure 3 is a cross-sectional view of the liner and a sheet of rubber material placed thereon.

As shown on the drawings:

The reference numeral 10 denotes in general a roll or coil of a sheet or web of rubber material 11 with the successive windings thereof separated by a liner 12. The liner 12 consists of a woven fabric body of interwoven strands 13 having a coating 14 impregnating the fabric body and enveloping the strands 13. As shown in Figure 3, the strands 13 provide a rough outer surface to the fabric, which facilitates adhesion of the coating to the fabric and also facilitates the stripping of the rubber material from the coated fabric due to the airpockets 15 therebetween.

The liners of the present invention have been found to be especially suitable for use in connection with synthetic rubber compositions such as copolymers of butadiene and acrylonitrile, or of butadiene, acrylonitrile and styrene, and containing ester type plasticizer, although it can be used with natural and all types of synthetic rubber. The insertion of a liner of the type herein disclosed between alternate sheets of the rubber material prevents deterioration of the surface of the rubber sheets, even after prolonged storage. While adhering lightly to the surfaces of the liner, the rubber sheet may nevertheless be readily stripped therefrom without any of the rubber material being left stuck to the liner or vice versa. Instead of being wound up into a roll the rubber sheets and liners may be laid flat in superimposed relation in a stack.

We claim as our invention:

As a new article of manufacture, a laminated structure comprising alternate layers of a coated fabric liner and of a synthetic rubber selected from the group consisting of copolymers of butadiene and acrylonitrile and of copolymers of butadiene, acrylonitrile and styrene, said fabric liner being coated on both sides with a cured polyvinyl butyral composition comprising the reaction product of 100 parts by weight of polyvinyl butyral, an acetal forming compound equivalent to from 5 to 25 parts by weight of hexamethylenetetramine and an ester type plasticizer, whereby said rubber layer may be readily stripped from said liner without portions of said synthetic rubber layer being left stuck thereto.

EMANUEL GURIN.
KARL FOX.

References Cited in the file of this patent

UNITED STATES PATENTS

| Number | Name | Date |
| --- | --- | --- |
| 1,749,743 | Sebrell | Mar. 4, 1930 |
| 2,201,537 | Hickler | May 21, 1940 |
| 2,268,121 | Kingsley | Dec. 30, 1941 |
| 2,387,831 | Cogan et al. | Oct. 30, 1945 |
| 2,409,548 | Debacher | Oct. 15, 1946 |
| 2,430,931 | Hershberger | Nov. 18, 1947 |
| 2,441,542 | Lawrence | May 11, 1948 |

FOREIGN PATENTS

| Number | Country | Date |
| --- | --- | --- |
| 574,459 | Great Britain | Jan. 7, 1945 |
| 573,437 | Great Britain | Nov. 21, 1945 |